Aug. 5, 1958
E. A. LAVOND
2,845,753
TOOL SHARPENING DEVICES
Filed Aug. 30, 1955
2 Sheets-Sheet 1
Fig. 1
Fig. 6
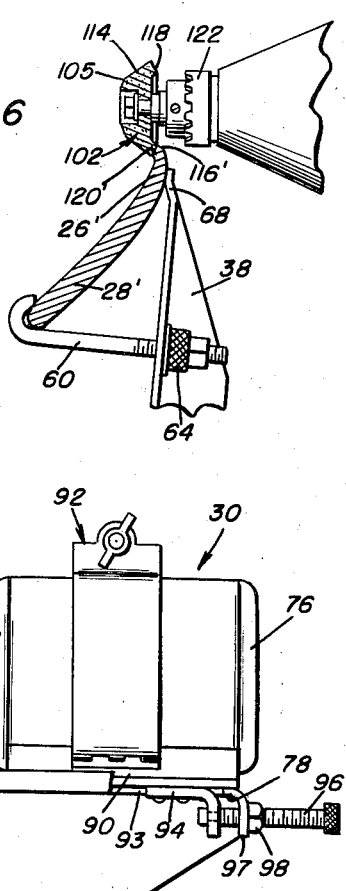
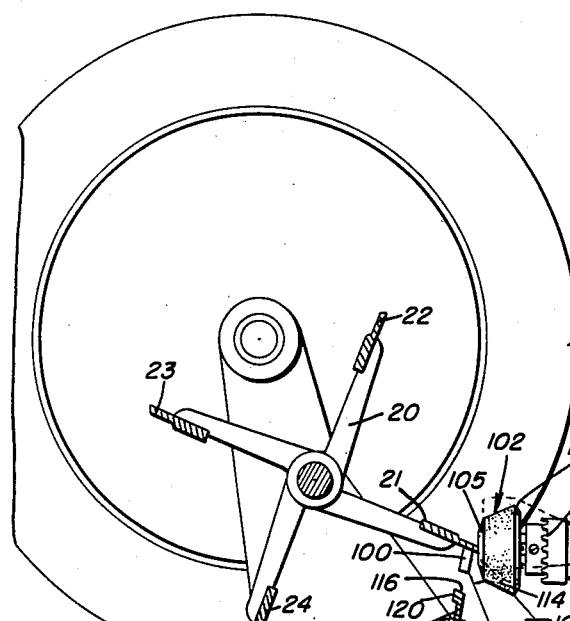
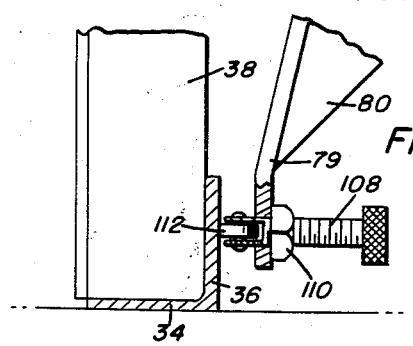
Fig. 3
Edward A. Lavond
INVENTOR.
BY *Clarence A. O'Brien*
*and Harvey B. Jackson*
Attorneys Aug. 5, 1958 E. A. LAVOND 2,845,753
TOOL SHARPENING DEVICES
Filed Aug. 30, 1955 2 Sheets-Sheet 2
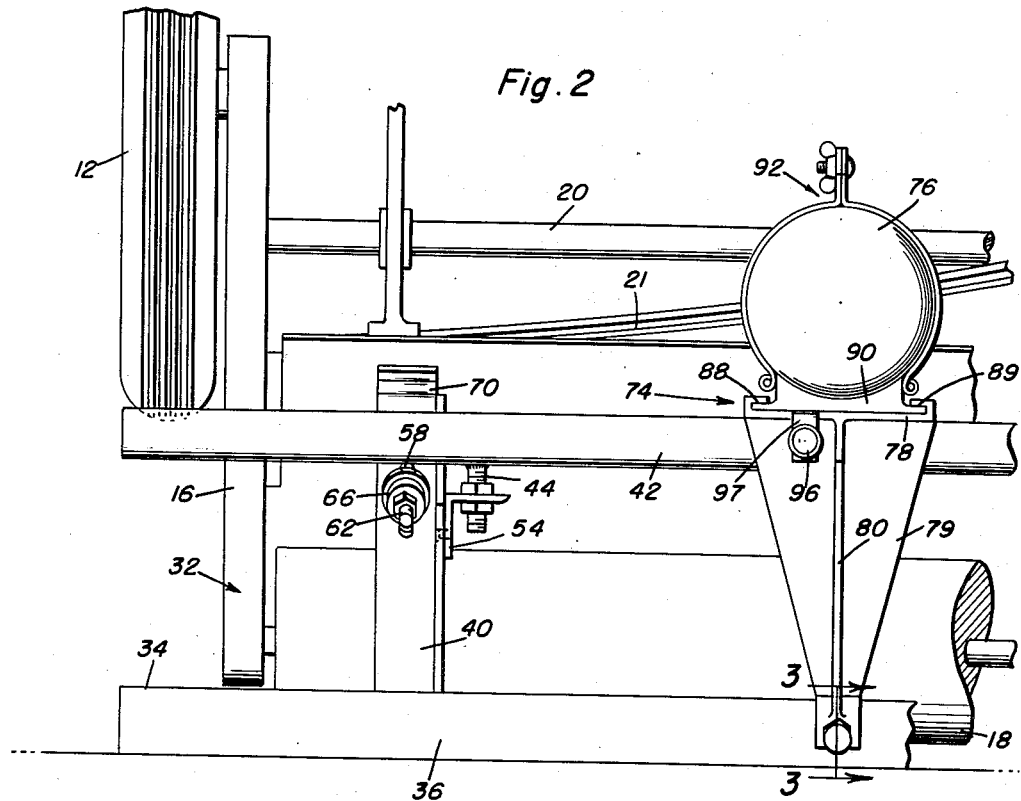
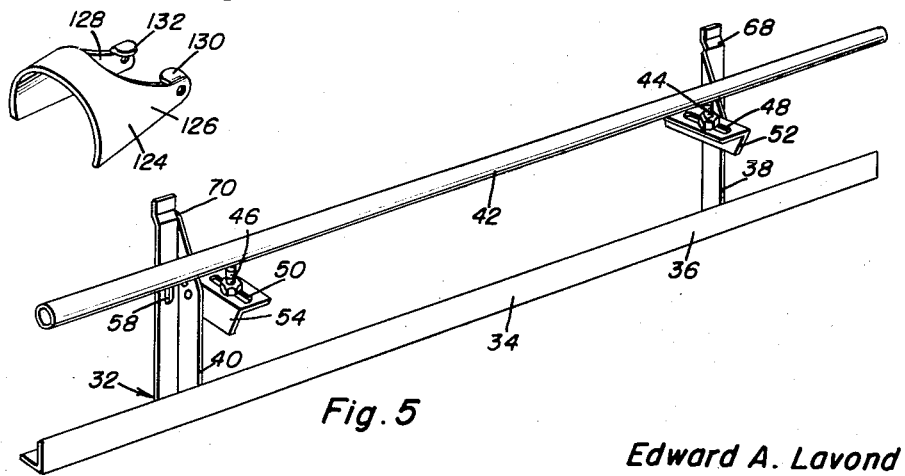
Edward A. Lavond
INVENTOR.

United States Patent Office 2,845,753
Patented Aug. 5, 1958

2,845,753

TOOL SHARPENING DEVICES

Edward A. Lavond, Carmichael, Calif.

Application August 30, 1955, Serial No. 531,343

7 Claims. (Cl. 51—56)

This invention relates to tool sharpening devices, and particularly to a lawn mower sharpener.

An object of this invention is to provide a lawn mower sharpener which is accurate in its operation, and yet which is mechanically simple in order that it may be constructed at a reasonable cost.

Another object of this invention is to provide a lawn mower sharpening device which is arranged to clamp on the cutter bar support and abut the lawn mower roller in order to obtain a base reference from which to grind each of the blades of the cutter reel, there being no adjustments necessary between or during the grinding operation performed on each of the reel blades, whereby each blade is uniformly sharpened.

A further object of this invention is to provide a lawn mower sharpener as described above wherein several simple adjustments are made in order to obtain the optimum bevel angle on the reel blades and, in addition, other simple adjustments are made in order to sharpen the stationary cutting bar.

A further object of this invention is to provide a lawn mower sharpener which is capable of sharpening all cutting surfaces of a lawn mower with a minimum of effort, and capable of sharpening the complete edge of each of the cutters.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a vertical sectional view of the lawn mower sharpener attached to a standard lawn mower;

Figure 2 is a fragmentary elevational view of the sharpener attached to and in operation on a lawn mower;

Figure 3 is an enlarged fragmentary sectional view taken approximately on the line 3—3 of Figure 2 and in the direction of the arrows;

Figure 4 is a perspective view of the grinder guard; and

Figure 5 is a perspective view of the base portion of the lawn mower sharpener.

Figure 6 is a fragmentary sectional view showing a second standard type of lawn mower cutter bar being sharpened by the sharpening device.

In the accompanying drawings, there is illustrated a lawn mower fragment which includes wheels 10 and 12 carried by portions 14 and 16 of the lawn mower chassis, together with a roller 18 which extends there across. Reel 20 also extends across these portions of the chassis of the lawn mower and the reel is of standard construction as are all other lawn mower parts illustrated. Accordingly, the reel 20 has reel blades 21, 22, 23, and 24, respectively, which are carried by it and form a part thereof. The stationary cutter bar 26 is adjustably secured to its support 28, the latter being mechanically connected to the chassis of the lawn mower in the usual manner.

The lawn mower sharpener 30 comprises a frame 32 which is made of a base 34, the latter of such selection of material that it has an upstanding flange 36. Frame 32 has a pair of supports 38 and 40 which rise from the base 34 and which are fixed thereto by welding or other mechanical expedients. It is preferred that these supports be of angle stock, although this is not an essential. A rail 42 is carried by supports 38 and 40 through a suitable adjusting means, and rail 42 is parallel to the base 34.

The means for mounting rail 42 on their supports 38 and 40 consists of bolts 44 and 46 fixed to the rail and extending through slots 48 and 50 in brackets 52 and 54, the latter being bolted or otherwise fixed to one flange of each support 38 and 40. Support 38 has slot 56 formed in it, while support 40 has an identical slot 58. Means for releasably attaching the frame 32 to the stationary cutter bar support 28 are disposed in the slots 56 and 58. The preferred means consist of hooks 60 and 62 having their curved ends engaged with the support 28 and having their shanks passed through the slots 56 and 58. Knurled nuts 64 and 66 are threaded on the hooks 60 and 62, and the nuts are backed by washers and, where desirable, jam nuts. The upper ends of the supports 38 and 40 are offset as at 68 and 70 in order to form pads which bear against one surface of the stationary cutter bar 26. Accordingly, when the nuts 64 and 66 are drawn up, the support 28 is drawn toward the frame 32 and a flat surface of the stationary cutter bar 26 is at the same time drawn flush against the pads at the upper ends of supports 38 and 40. Meanwhile, the roller 18 of the lawn mower is pulled tightly against the supports 38 and 40. By virtue of this construction, the lawn mower is firmly and securely connected with the frame 32 so that there will be no relative movement between the two.

A carriage 74 is slidable on frame 32 and it supports a motor 76. Carriage 74 consists of a base plate 78 from the lower surface of which intersecting supporting plates 79 and 80 depend. Parallel guides 82 and 84 also depend from the lower surface of the base plate 78, and these guides are disposed on opposite sides of the rail 42 allowing the carriage 78 to be slid from one end of the rail to the other, but preventing the carriage from being rotated about any axis other than the longitudinal axis of the rail 42. Guideways 88 and 89 are formed along the side edges of the base plate 78, and the motor bed plate 90 to which the motor 76 is clamped by clamp structure 92 is slidable therein. Slot 93 is formed in the base plate 78 and a shoe 94 is captive in the slot 93. This shoe being secured to the bed plate 90 is movable with the bed plate. Means for adjusting thte motor 76 on its carriage 74 are operatively connected with the shoe 94. Preferably, the adjusting means consists of a screw 96 which passes through a threaded opening in a depending portion 97 of the base plate 78. Screw 96 is captive in a hole in shoe 94 so that it is capable of being rotated with respect to the shoe but which is incapable of being separated therefrom. An adjusting jam nut 98 is disposed on the screw 96 so that when proper motor adjustment is obtained, it may be locked in place by the jam nuts 98.

A reel blade stop and support 100 is arranged adjacent to the grinder 102. The stop and support consist of a bracket 104 bolted or otherwise fixed to the carriage 74, the upper end of the bracket providing a surface against which one of the reel blades bears and is guided while the carriage is being moved on rail 42 to perform the sharpening operations on the reel 20. The specific grinder 102 is important and that it is cup shaped to provide best grinding results. The front face 105 is slanted relative to the rotation axis of the motor and motor shaft, and this surface is used for sharpening the reel blades 21, 22, 23, and 24. The means for adjusting the bevel angle which is formed on the edges of the reel blades are seen best in Figure 3 and consist of a screw 108 passed through a threaded opening in the bottom of plate 79 and having a lock nut 110 thereon. The inner end of screw 108 is bifurcated or otherwise fashioned to accommodate a roller 112. This roller bears upon the upstanding flange 36 of base 34. When the carriage is moved back and forth on rail 42, the roller 112 rotates. Upon adjustment of the screw 108, the carriage is tilted about the axis of rail 42, thereby changing the face angle of surface 105 on grinder 102. This would result in the grinding of a slightly different angle of bevel on cutters 21, 22, 23, and 24. The grinder 102 has a conical surface 114 intermediate the front and rear ends thereof and this conical surface is adapted to be brought against the edge 116 of the stationary cutter bar 26. The rear inclined surface 118 of the grinder 102 is adapted to be brought against the upper surface 120 at the edge 116 of the stationary cutter bar 26 in a manner to be described subsequently. In order to hold the grinder 102 in place in the motor 76, a chuck 122 is used.

A guard for the grinder 102 is used. This guard consists of a housing 124 having furcations 126 and 128 protruding from one end thereof and adapted to be connected to the motor housing by means of trunnions. Stops 130 and 132 are connected with the furcations 126 and 128 and rest upon a portion of the motor housing to prevent the guard from coming down upon the grinder 102.

In operation, the lawn mower is placed on a convenient surface, as at 138. Frame 32 is brought up against the roller 18, and after the same has been trued with respect to the stationary cutter 26 and the reel 20. Blade support 28 is engaged by the hooks 60 and 62 and by tightening the nuts on the hooks, the bottom surface of the stationary cutting blade 26 is brought to bear against the pads at the upper ends of the supports 38 and 40. The desired angle of bevel to be ground on blades 21, 22, 23, 24 is selected by adjusting the screw 108, thereby tilting the entire carriage 74. After this angularity has been determined and provided for, rail 42 is adjusted horizontally, parallel with cutting edge of one reel blade by means of bolts 44 and 46 within slots 48 and 50, using face 105 of grinder 102 as an index at each end of reel blade. The motor is then actuated, carriage 74 moved along rail 42 to grind each blade successively. During this grinding procedure, the rotation of cutter 102 retains the reel blades 21, 22, 23 and 24 against the guide surface on stop 100.

When all of the blades of the reel are sharpened in this manner, the bracket 104 is removed or turned out of the way, and motor 76 is moved inwardly by rotation of the screw 96. The conical surface 114 of the cutter being adjusted in this way to contact surface 116 of the stationary cutting bar 26, a grinding cut is taken along the complete edge thereof. Then the motor 76 is moved inwardly by means of screw 96 to position back surface 118 of grinder 102 in contact with face 120 of cutter blade. This is accomplished by lifting the motor-grinder and carriage 74 assembly off rail 42 and passing grinder 102 over and back of blade 26.

Screw 96 serves a dual purpose—to move grinder and motor assembly into the three required positions for grinding all blades and also to regulate the amount of cut taken at each pass of grinder against blades. Bolts 44 and 46 are provided principally for adjusting rail 42 parallel to the blades.

Figure 6 shows surface 120′ being sharpened, the surface 116′ having been previously sharpened. These surfaces correspond to the surfaces 116 and 120 of cutter bar 26. Some commercially available mowers have the stationary cutter bar 26′ attached integrally with their supports, as at 28′. Whether the attachment is for adjustment or not, as by being riveted or attached integrally, is not significant to the lawn mower sharpener, since it will operate exactly as well with either lawn mower construction. Other manufacturing differences between lawn mowers are similarly considered.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a lawn mower which has a stationary cutter, a support holding said cutter and a reel having blades operable with said stationary cutter, the improvement comprising a sharpener for said stationary cutter and said blades, said sharpener having a frame, means on said frame and engageable with said stationary cutter support for attaching said frame to the lawn mower, means on said frame for contacting a face of said stationary cutter and coacting with the first-mentioned means to hold said frame fastened to the lawn mower, a carriage movable from one end of the lawn mower to the other, means carried by said frame for supporting said carriage, a grinding device, means carried by said carriage for actuating said grinding device, said grinding device having surfaces for respectively facing said reel blades and said stationary cutter, means carried by said carriage for moving said grinding device in a direction normal to the path of travel of said carriage, and means for tilting said carriage about an axis of rotation coincident with said path of travel in order to adjust the angle at which said grinding device is brought in contact with said blades.

2. In a lawn mower which has a stationary cutter, a support holding said cutter and a reel having blades operable with said stationary cutter, the improvement comprising a sharpener for said stationary cutter and said blades, said sharpener having a frame, means on said frame and engageable with said stationary cutter support for attaching said frame to the lawn mower, means on said frame for contacting a face of said stationary cutter and coacting with the first-mentioned means to hold said frame fastened to the lawn mower, a carriage movable from one end of the lawn mower to the other, means carried by said frame for supporting said carriage, a grinding device, means carried by said carriage for actuating said grinding device, said grinding device having surfaces for respectively facing said reel blades and said stationary cutter, means carried by said carriage for moving said grinding device in a direction normal to the path of travel of said carriage, and means for tilting said carriage about an axis of rotation coincident with said path of travel in order to adjust the angle at which said grinding device is brought in contact with said blades, and a guard overlying a portion of said grinding device together with means mounting said guard for pivotal motion.

3. The subject matter of claim 2 wherein the lawn mower has a roller and the sharpener frame has an abutment against which the roller is adapted to bear when said frame and the mower are fastened together, said means engageable with said stationary cutter support including a hook adjustably carried by a part of said frame, and said means for moving said grinding device in a direction normal to the path of travel of the carriage comprising an adjusting screw carried by said carriage.

4. A device to sharpen all of the cutting edges of a mower having a reel and a stationary cutter bar, said device comprising a frame having a rail, supports to which said rail is adjustably attached, means carried by and coacting with said supports for mounting said frame on the mower, a carriage mounted on said rail and movable from one end to the other end of the reel of the mower, a cupped grinder, means mounting said grinder on said carriage for rotation, said grinder having a surface for grinding the reel edges as the carriage is moved on its rail, and said grinder having two additional surfaces for grinding sequentially two surfaces of the mower cutter bar.

5. A device to sharpen all of the cutting edges of a mower having a reel and a stationary cutter bar, said device comprising a frame having a rail, supports to which said rail is adjustably attached, means carried by and coacting with said supports for mounting said frame on the mower, a carriage mounted on said rail and movable from one end to the other end of the reel of the mower, a motor, a grinder driven by said motor and movable with said carriage, said frame having a base, means contacting said base and connected with said carriage for tilting said carriage for adjustment about said rail, and a rest for the reel blades carried by said carriage.

6. A device to sharpen all of the cutting edges of a mower having a reel and a stationary cutter bar, said device comprising a frame having a rail, a pair of supports to which said rail is adjustably attached, means adjustably carried by and coacting with said supports for mounting said frame on the mower, a carriage mounted on said rail and movable from one end to the other end of the reel of the mower, a motor, a grinder driven by said motor and movable with said carriage, said supports protruding above said rail, and means on the portions of said supports which so protrude for supporting the mower stationary cutter bar while it is being ground.

7. In a lawn mower which has a stationary cutter, a support holding said cutter, a roller, and a reel having blades operable with said stationary cutter, the improvement comprising a sharpener for said stationary cutter and said blades, said sharpener having a frame, an abutment on said frame against against which said roller is adapted to rest, adjustable means on said frame and engageable with said stationary cutter support for attaching said frame to the lawn mower, means on said frame for contacting a face of said stationary cutter and coacting with said attaching means to hold said frame fastened to the lawn mower, a carriage movable from one end of the lawn mower to the other, a rail carried by said frame and supporting said carriage, a grinding device, a motor carried by said carriage for actuating said grinding device, said grinding device having surfaces for respectively facing said reel blades and said stationary cutter, an adjusting screw carried by said carriage for moving said motor and said grinding device in a direction normal to the path of travel of said carriage, and means for tilting said carriage about an axis of rotation coincident with said path of travel on said rail in order to adjust the angle at which the grinding device is brought in contact with said blades.

References Cited in the file of this patent

UNITED STATES PATENTS

| | | |
|---|---|---|
| 850,922 | Goforth et al. | Apr. 23, 1907 |
| 2,245,968 | Erdman | June 17, 1941 |
| 2,530,479 | Pater et al. | Nov. 21, 1950 |
| 2,562,578 | Rickman | July 31, 1951 |
| 2,572,530 | Smith | Oct. 23, 1951 |